(12) United States Patent
Beck et al.

(10) Patent No.: US 11,066,192 B2
(45) Date of Patent: Jul. 20, 2021

(54) SATELLITE DEPLOYER DOOR WITH CLUTCH BEARING

(71) Applicant: Rocket Lab USA, Inc., Huntington Beach, CA (US)

(72) Inventors: Peter Beck, Auckland (NZ); Peter Barlow, Huntington Beach, CA (US); David Yoon, La Crescenta, CA (US); Ben Malcolm, Auckland (NZ)

(73) Assignee: Rocket Lab USA, Inc., Huntington Beach, CA (US)

( * ) Notice: Subject to any disclaimer, the term of this patent is extended or adjusted under 35 U.S.C. 154(b) by 292 days.

(21) Appl. No.: 16/051,267

(22) Filed: Jul. 31, 2018

(65) Prior Publication Data
US 2019/0039755 A1    Feb. 7, 2019

Related U.S. Application Data

(60) Provisional application No. 62/541,493, filed on Aug. 4, 2017.

(51) Int. Cl.
*B64G 1/22* (2006.01)
*F16C 29/00* (2006.01)
(Continued)

(52) U.S. Cl.
CPC .............. *B64G 1/22* (2013.01); *B26D 5/12* (2013.01); *B60P 7/135* (2013.01); *B60P 7/16* (2013.01);
(Continued)

(58) Field of Classification Search
CPC .......... B64G 1/22; B64G 1/007; B64G 1/222; B64G 1/645; E05F 1/105; E05F 2900/531; E05F 3/20; E05F 2201/216
See application file for complete search history.

(56) References Cited

U.S. PATENT DOCUMENTS 3,144,956 A * 8/1964 Anderson ................ E05C 9/18
                                                        220/316
3,991,649 A    11/1976 Patrichi
(Continued)

FOREIGN PATENT DOCUMENTS

| CN | 106081170 A | 11/2016 |
|---|---|---|
| KR | 20160147547 A | 12/2016 |
| WO | 2008034550 A1 | 3/2008 |

OTHER PUBLICATIONS

Donaldson et al. "Ejection and Recovery System for Cubesat Sized Ejectables on Sounding Rockets". Apr. 22, 2017. Retrieved from the Internet on Sep. 19, 2018. URL: (https://web.archive.org/web/20170422053555/http://rexusbexus.net/wp-content/uploads/2015/06/Suineadh-_IAC-Paper. pdf>.
(Continued)

*Primary Examiner* — Assres H Woldemaryam
*Assistant Examiner* — Aaron M Rodziwicz
(74) *Attorney, Agent, or Firm* — Van Pelt, Yi & James LLP

(57) ABSTRACT

A satellite dispenser door assembly is disclosed. In various embodiments, a satellite dispenser door assembly as disclosed herein includes a dispenser door having a hinge pin; and a one way clutch bearing within which the hinge pin is free to rotate in a first rotational direction associated with a transition from a closed position of the dispenser door to an open position of the dispenser door.

14 Claims, 3 Drawing Sheets

(51) Int. Cl.
| | |
|---|---|
| *F16C 33/24* | (2006.01) |
| *E05D 3/08* | (2006.01) |
| *E05D 7/00* | (2006.01) |
| *E05F 3/20* | (2006.01) |
| *B60P 7/135* | (2006.01) |
| *B60P 7/16* | (2006.01) |
| *B26D 5/12* | (2006.01) |
| *E05F 1/10* | (2006.01) |
| *B64G 1/64* | (2006.01) |
| *B64G 1/00* | (2006.01) |
| *F42B 3/00* | (2006.01) |

(52) U.S. Cl.
CPC ............... *E05D 3/08* (2013.01); *E05D 7/00* (2013.01); *E05F 1/105* (2013.01); *E05F 3/20* (2013.01); *F16C 29/005* (2013.01); *F16C 33/24* (2013.01); *B64G 1/007* (2013.01); *B64G 1/222* (2013.01); *B64G 1/645* (2013.01); *E05Y 2201/216* (2013.01); *E05Y 2201/426* (2013.01); *E05Y 2900/50* (2013.01); *E05Y 2900/531* (2013.01); *F16C 2208/82* (2013.01); *F16C 2223/32* (2013.01); *F16C 2326/47* (2013.01); *F42B 3/006* (2013.01)

(56) References Cited

U.S. PATENT DOCUMENTS

| | | | |
|---|---|---|---|
| 4,210,274 A | 7/1980 | Leonard | |
| 4,540,873 A | 9/1985 | Kester | |
| 4,771,971 A | 9/1988 | Ludwig | |
| 4,779,826 A | 10/1988 | Kiendl | |
| 4,936,367 A | 6/1990 | Marello | |
| 4,984,666 A | 1/1991 | Orii | |
| 5,050,821 A | 9/1991 | Kerstein | |
| 5,109,571 A * | 5/1992 | Ohshima | A47K 13/10 16/284 |
| 5,364,046 A | 11/1994 | Dobbs | |
| 5,462,800 A | 10/1995 | Yamazaki | |
| 5,664,897 A | 9/1997 | Hennings | |
| 5,743,492 A | 4/1998 | Chan | |
| 5,755,406 A | 5/1998 | Aston | |
| 5,755,407 A | 5/1998 | Aubret | |
| 5,848,766 A | 12/1998 | Thompson | |
| 6,126,115 A | 10/2000 | Carrier | |
| 6,227,493 B1 | 5/2001 | Holemans | |
| 6,357,699 B1 | 3/2002 | Edberg | |
| 6,532,628 B2 * | 3/2003 | Kim | G06F 1/1601 16/337 |
| 6,668,985 B2 | 12/2003 | Krenkel | |
| 6,869,048 B2 | 3/2005 | Draisey | |
| 6,886,221 B2 * | 5/2005 | Minami | H04M 1/0216 16/303 |
| 6,901,836 B1 | 6/2005 | Valembois | |
| 6,904,644 B2 * | 6/2005 | Oshima | G06F 1/1616 16/330 |
| 6,905,097 B2 | 6/2005 | Blackwell-Thompson | |
| 7,065,834 B2 * | 6/2006 | Lowry | H04M 1/0216 16/303 |
| 7,107,648 B1 * | 9/2006 | Lu | H04M 1/0216 16/330 |
| 7,111,773 B1 * | 9/2006 | So | G06F 1/1626 235/1 D |
| 7,155,780 B2 * | 1/2007 | Chen | H04M 1/0216 16/326 |
| 7,213,301 B2 * | 5/2007 | Sakai | H04M 1/0216 16/303 |
| 7,350,664 B2 * | 4/2008 | Nam | E05D 7/086 220/262 |
| 7,386,918 B2 * | 6/2008 | Tomizawa | G06F 1/1616 16/303 |
| 7,401,381 B2 * | 7/2008 | Konja | E05F 1/1016 16/285 |
| 7,543,357 B2 * | 6/2009 | Ishikawa | H04M 1/0216 16/303 |
| 7,634,838 B2 * | 12/2009 | Ge | H04M 1/0216 16/303 |
| 7,699,378 B2 * | 4/2010 | Smith | E05F 1/1223 296/57.1 |
| 7,712,186 B2 * | 5/2010 | Kang | F25D 23/028 16/330 |
| 7,814,620 B2 * | 10/2010 | Lin | H04M 1/0216 16/330 |
| 8,079,115 B2 * | 12/2011 | Zhang | H04M 1/0216 16/326 |
| 8,132,292 B2 * | 3/2012 | Patterson | H04M 1/0216 16/340 |
| 8,424,160 B2 * | 4/2013 | Chen | G06F 1/1681 16/278 |
| 8,432,677 B2 * | 4/2013 | Duan | G06F 1/1681 361/679.27 |
| 8,459,754 B2 * | 6/2013 | Cho | D06F 39/14 312/228 |
| 8,745,820 B2 * | 6/2014 | Janak | E05F 3/14 16/54 |
| 8,769,770 B2 * | 7/2014 | Kullman | B65F 1/068 16/54 |
| 9,115,519 B2 * | 8/2015 | Li | F16F 9/3214 |
| 9,289,879 B2 * | 3/2016 | Copeland | E05D 7/00 |
| 9,290,880 B2 * | 3/2016 | Park | D06F 39/14 |
| 9,394,645 B2 * | 7/2016 | Park | D06F 39/14 |
| 9,414,724 B2 * | 8/2016 | Vallance | E05F 3/20 |
| 9,434,486 B1 * | 9/2016 | Santos | B64G 1/64 |
| 9,464,376 B2 * | 10/2016 | Kim | D06F 39/14 |
| 9,725,940 B2 * | 8/2017 | Lambright | E05F 1/123 |
| 9,796,488 B2 | 10/2017 | Cook | |
| 10,011,373 B1 | 7/2018 | Echelman | |
| 10,017,279 B2 | 7/2018 | Poncet | |
| 10,053,243 B2 | 8/2018 | Apland | |
| 10,370,124 B2 | 8/2019 | Dube | |
| 10,569,910 B2 * | 2/2020 | Bogdanov | B64G 1/645 |
| 10,689,133 B2 | 6/2020 | Cheynet De Beaupre | |
| 10,773,831 B2 | 9/2020 | Wang | |
| 2003/0192522 A1 | 10/2003 | Taryoto | |
| 2005/0045771 A1 | 3/2005 | Caldwell | |
| 2005/0230562 A1 | 10/2005 | Buehler | |
| 2006/0049317 A1 | 3/2006 | Reutenauer | |
| 2012/0112010 A1 | 5/2012 | Young | |
| 2012/0280085 A1 | 11/2012 | Sinclair | |
| 2013/0099059 A1 | 4/2013 | Cheynet De Beaupre | |
| 2013/0282117 A1 | 10/2013 | Van Heugten | |
| 2014/0117028 A1 | 5/2014 | Huber | |
| 2014/0131521 A1 | 5/2014 | Apland et al. | |
| 2014/0319283 A1 | 10/2014 | Holemans | |
| 2016/0075452 A1 | 3/2016 | Robles | |
| 2016/0200459 A1 | 7/2016 | Aston | |
| 2016/0207605 A1 | 7/2016 | Jensen | |
| 2017/0072647 A1 | 3/2017 | Perrillat et al. | |
| 2017/0081011 A1 | 3/2017 | Matthews | |
| 2017/0174368 A1 | 6/2017 | Dube | |
| 2017/0225873 A1 | 8/2017 | Fougere | |
| 2017/0320597 A1 | 11/2017 | Lim | |
| 2017/0327253 A1 | 11/2017 | Bogdanov | |
| 2018/0194494 A1 | 7/2018 | Dube | |

OTHER PUBLICATIONS

Holemans et al. "Canisterized Satellite Dispenser (CSD) As a Standard for Integrating and Dispensing Hosted Payloads on Large Spacecraft and Launch Vehicles", May 2014.

"Small Spacecraft Technology State of the Art", Dec. 2015, NASA Mission Design Division, pp. 125-129 (Year: 2015).

* cited by examiner

SATELLITE DEPLOYER DOOR WITH CLUTCH BEARING

CROSS REFERENCE TO OTHER APPLICATIONS

This application claims priority to U.S. Provisional Patent Application No. 62/541,493 entitled SMALL SCALE SATELLITE DEPLOYER filed Aug. 4, 2017 which is incorporated herein by reference for all purposes.

GOVERNMENT LICENSE RIGHTS

This invention was made with Government support under Contract No. 2014-14031000011 awarded by a United States Government Agency. The United States Government has certain rights in the invention.

BACKGROUND OF THE INVENTION

Small scale satellites, such as CubeSat or other small satellites, may be launched into space in a launch vehicle that includes a plurality of such satellites, each contained in a "dispenser" device, sometimes referred to as a small scale satellite "deployer", configured to deploy the small scale satellite in a controlled manner, e.g., to achieve a target orbit. The terms "dispenser" and "deployer" are used interchangeably in this specification.

Satellites conforming to the CubeSat Design Specification may have a size and form factor of a corresponding type or class of CubeSat as defined by the standard. The size and form factor of a CubeSat is based on a standard 10×10×11.35 cm3 unit designed to provide 10×10×10 cm3 (or 1 liter) of useful volume. CubeSats of different types may comprise a different number of such units. For example, CubeSats comprising 1, 3, 6, or 12 units, sometimes designated as 1 U, 3 U, 6 U, and 12 U CubeSats, respectively, may be encountered. Other satellites comprising other whole or fractional numbers of standard units may be launched and deployed.

Small scale satellite dispensers typically have a shape, size, and form factor to accommodate a corresponding small scale satellite, and commonly have a door that provides access to a payload area of the dispenser. The small scale satellite (payload) is loaded into the dispenser through the opening associated with the door, with the door in the open position. The door is closed and secured in the closed position. The dispenser may be arranged with other dispensers in a chassis configured to accommodate multiple dispensers. The chassis is loaded into a launch vehicle, such as a rocket, and launched into space. Control circuits initiate deployment of the small scale satellite at a time, orientation, etc. associated with the target orbit of each respective small scale satellite. Typically, a satellite is deployed by causing the dispenser door to open at a precise time, resulting in the small scale satellite being ejected from the dispenser and into orbit. Solar panels, antennae, and other appendages and auxiliary equipment may open, extend, or otherwise deploy once the small scale satellite has been ejected from the dispenser.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A satellite dispenser having a door that is able to swing open but not rotate back in the direction opposite of the open direction is disclosed. In various embodiments, a dispenser as disclosed herein includes a substantially square or other rectangular door hinged at one side/end. A release mechanism releases the door and spring force pushes/drives the door towards an open position. In various embodiments, to prevent the door from bouncing back or otherwise returning to a closed or partially closed position, a one way clutch bearing or equivalent structure is provided to allow the hinged end to rotate only in the open direction, and not to rotate back in the closed direction.

In some embodiments, the dispenser and/or door includes a hard stop, which is adjustable in some embodiments, to prevent the door from opening beyond a desired maximum extent, e.g., to avoid interfering with any adjacent dispenser in the same launch vehicle.

Figure 1A:
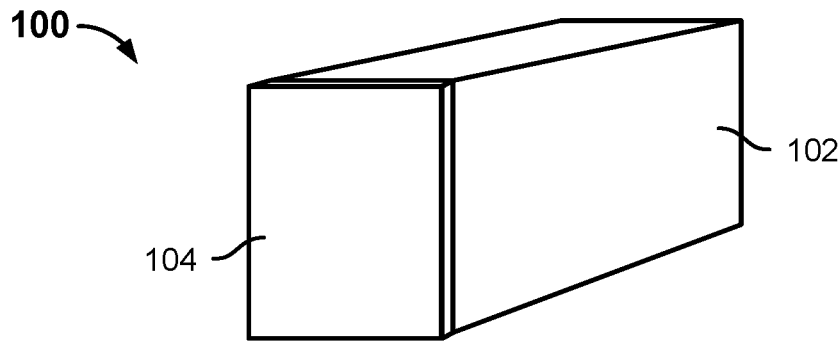
FIG. 1A is a diagram illustrating an embodiment of a small scale satellite dispenser.

FIG. 1A is a diagram illustrating an embodiment of a small scale satellite dispenser. In the example shown, dispenser 100 includes a dispenser casing or body 102 with a door 104 at one end. In the state shown in FIG. 1A, the dispenser door 104 is closed, as it would be subsequent to a small scale satellite being loaded into the dispenser 100 but before deployment.

Figure 1B:
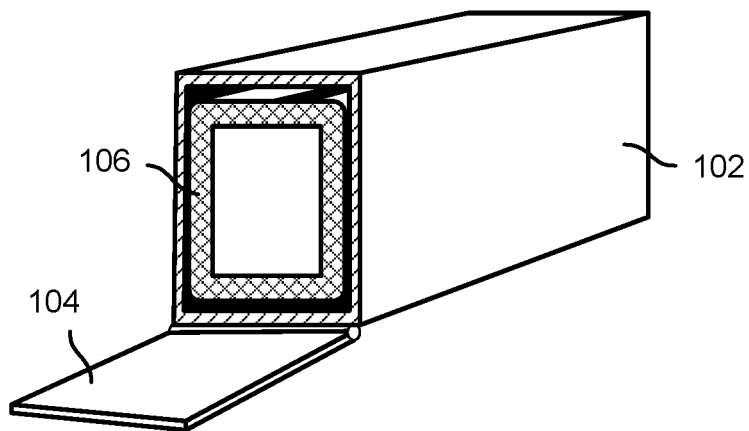
FIG. 1B is a diagram illustrating an embodiment of the small scale satellite dispenser 100 of FIG. 1A with the door 104 open.

FIG. 1B is a diagram illustrating an embodiment of the small scale satellite dispenser 100 of FIG. 1A with the door 104 open. A small scale satellite 106 is visible in the payload area defined by dispenser body 102. The state shown in FIG. 1B may be associated with loading the payload 106 into the dispenser 100, but prior to the door 104 being closed, and/or just prior to ejection of payload 106 after the door 104 being opened.

Figure 1C:
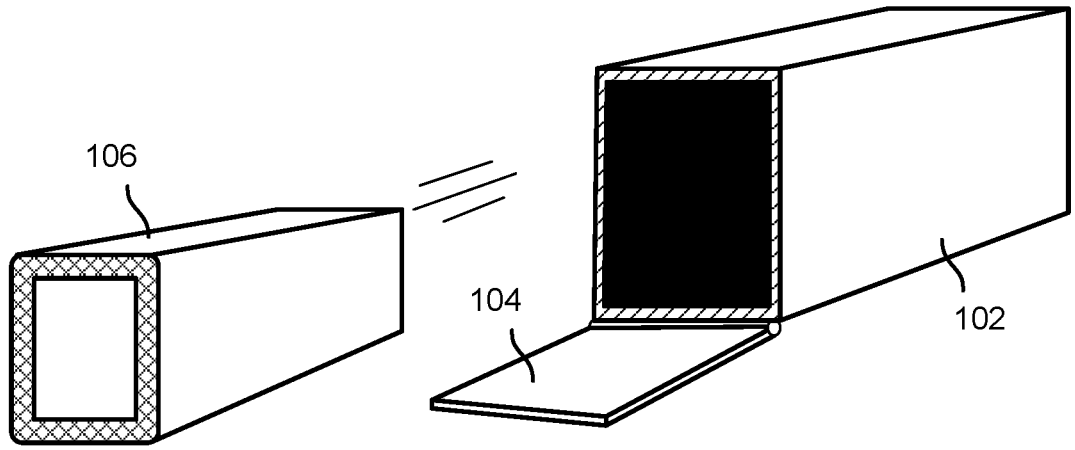
FIG. 1C is a diagram illustrating an embodiment of the small scale satellite dispenser 100 of FIG. 1A with the door 104 open and the payload 106 ejected from the payload area defined by dispenser body 102.

FIG. 1C is a diagram illustrating an embodiment of the small scale satellite dispenser 100 of FIG. 1A with the door 104 open and the payload 106 ejected from the payload area defined by dispenser body 102. In various embodiments, the payload 106 may have been ejected at least in part by a spring-loaded pusher plate against which the payload 106 had been pressed against during loading of payload 106 into dispenser 100, thereby compressing one or more springs associated with the pusher plate.

In various embodiments, the state of dispenser 100 as shown in FIGS. 1B and 1C is attained at least in part by activating a door release mechanism (not shown in FIGS. 1A through 1C) configured to hold door 104 in the closed position prior to activation. Upon activation of the door release mechanism, the door 104 is no longer held in the closed position. In various embodiments, one or more springs compressed by closing door 104 and securing door 104 in the closed position may, upon activation of the door release mechanism, cause the door 104 to be pushed open, as in FIGS. 1B and 1C, allowing the payload 106 to be ejected, as shown in FIG. 1C.

Figure 2A:
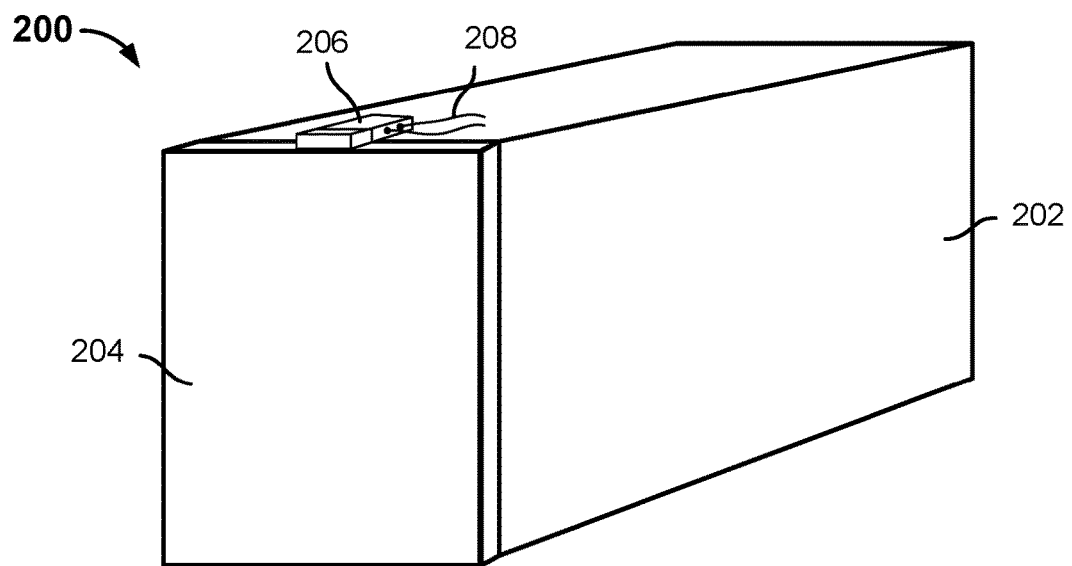
FIG. 2A is a diagram illustrating an embodiment of a small scale satellite dispenser provided with a pyrotechnic cutter door release mechanism prior to cutter activation.

FIG. 2A is a diagram illustrating an embodiment of a small scale satellite dispenser provided with a pyrotechnic cutter door release mechanism prior to cutter activation. In the example shown, satellite dispenser 200 includes a dispenser body 202 and door 204. The door 204 is held closed in the state shown by a door release mechanism 206 which in this example includes a wire or cable (not shown in FIG. 2A) to hold the door closed prior to deployment and two pyrotechnic cutters positioned and configured to cut the wire or cable to release the door 204 to enable the door 204 to open. In the example shown, electrical leads 208 are connected to the pyrotechnic cutters included in door release mechanism 206. In various embodiments, signals and/or power to activate the pyrotechnic cutters is/are provided via leads 208, e.g., from a driver or similar component comprising and/or otherwise associated with the dispenser 200.

Figure 2B:
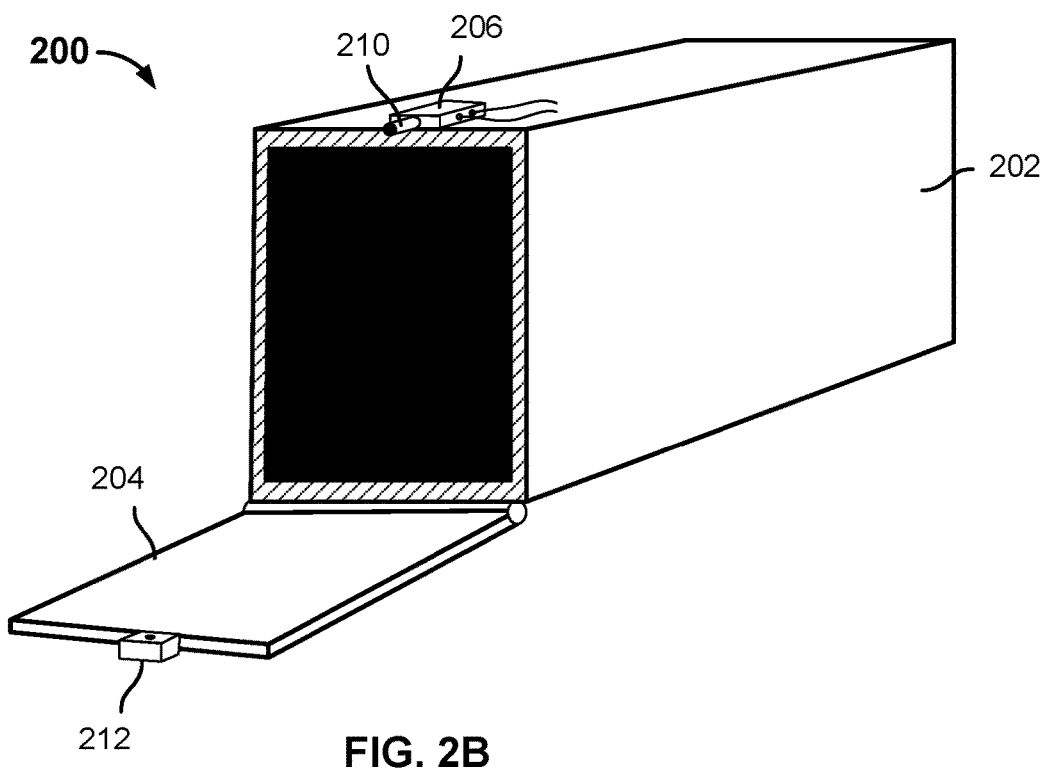
FIG. 2B is a diagram illustrating an embodiment of a small scale satellite dispenser provided with a pyrotechnic cutter door release mechanism after cutter activation.

FIG. 2B is a diagram illustrating an embodiment of a small scale satellite dispenser provided with a pyrotechnic cutter door release mechanism after cutter activation. In the state shown in FIG. 2B, the pyrotechnic cutters comprising door release mechanism 206 have been fired resulting in the cable or wire holding door 204 closed being cut. In the example shown, the door 204 has been assisted in opening by a spring-loaded pusher 210 being pushed out from the door release mechanism 206 once the wire or cable holding the door 204 shut had been cut. Also shown in FIG. 2B is a recess or cavity 212 into which a door side portion of the wire or cable that had been holding the door 204 closed has been pulled, e.g., by a spring-loaded plunger configured to extend into the cavity 212 pulling the door end of the cut wire or cable into cavity 212. In various embodiments, the wire or cable retraction mechanism configured to pull the free end of the cut wire or cable into cavity 212 ensures the loose (door) end of the cut wire or cable does not interfere with ejection and/or deployment of the small scale satellite from dispenser 200.

Figure 3:
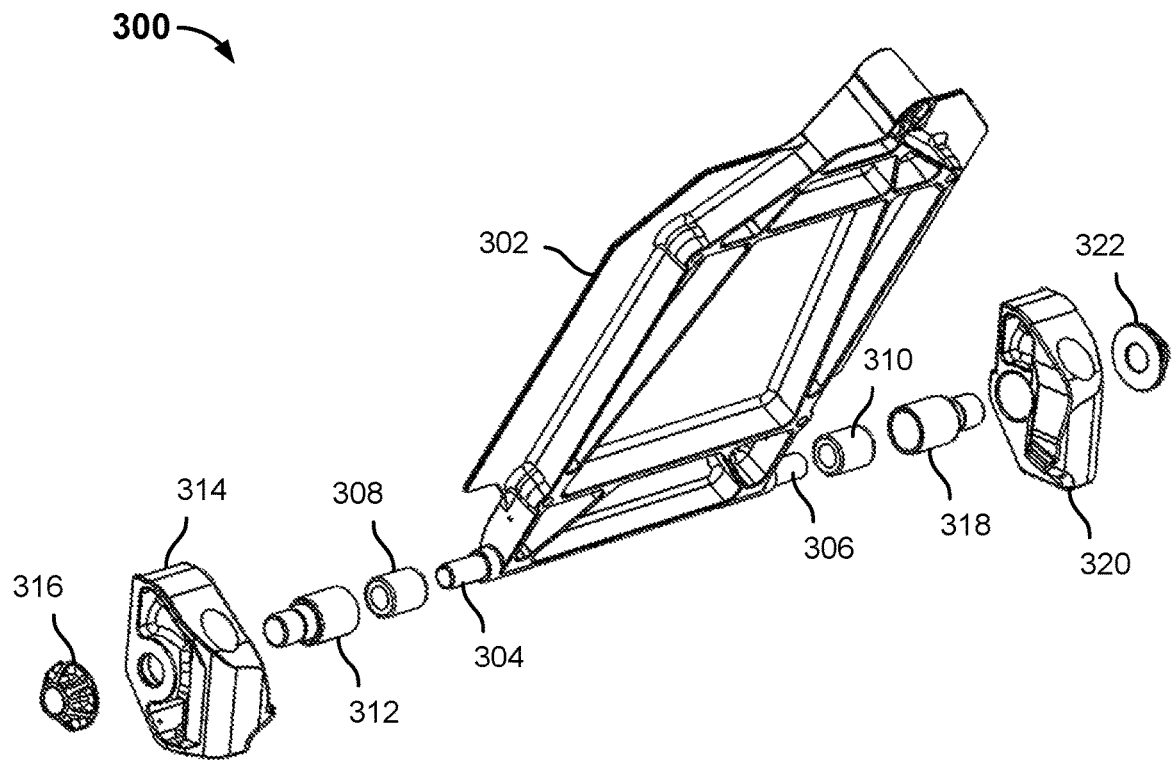
FIG. 3 is a diagram illustrating an embodiment of a satellite deployer (dispenser) door having a one way clutch bearing to prevent dispenser door bounce back.

FIG. 3 is a diagram illustrating an embodiment of a satellite deployer (dispenser) door having a one way clutch bearing to prevent dispenser door bounce back. In the example shown, door assembly 300 includes a door 302 having hinge pins 304 and 306. One way clutch bearings 308 and 310 are assembled onto hinge pins 304 and 306. Hinge extensions 312 and 318 are place over the one way clutch bears 308 and 310. The hinge extensions 312, 318 extend through openings in dispenser feet 314, 320 and are held in place by clutch nuts 316, 322. Once assembled, the one way clutch bearings 308, 310 allow the door 302 to swing open (roughly clockwise as shown in FIG. 3) but not back towards the closed position. In various embodiments, the one way bearings 308, 310 allow the door to spring open once the door release mechanism, e.g., as described herein, has been activated, but prevent the door from bouncing or being knocked back towards the closed position, which could prevent ejection of the payload, interfere with complete deployment of the payload, and/or damage the payload.

In some embodiments, the feet 314, 320 include a structure that acts as a hard stop to prevent the door 302 from opening past a design extent of opening. For example, in some embodiments hard stops comprising the feet 314, 320, combined with the one way clutch bearings 308, 310, operate to allow the door 302 to open to 110 degrees from the original closed position, and to remain open to the designed extent without return wholly or partly to the closed position. In some embodiments, the stops prevent the door 302 from opening so far as to potentially interfere with the opening of doors of other dispenser that may be mounted adjacent to the dispenser, e.g., in a launch and/or deployment vehicle configured to hold and deploy satellites from multiple dispensers.

Figure 4A:
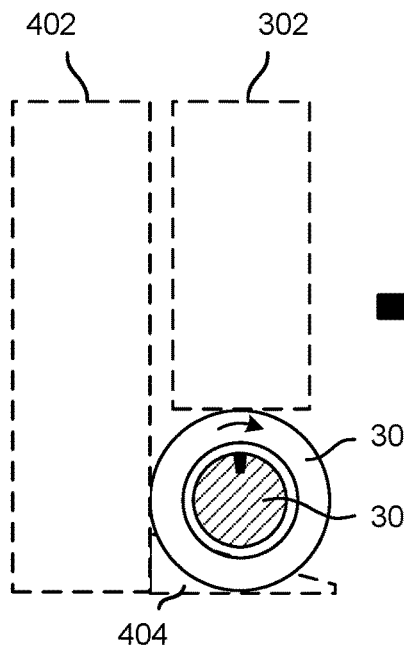
FIG. 4A is a diagram illustrating an embodiment of a satellite deployer (dispenser) door having a one way clutch bearing to prevent dispenser door bounce back.

FIG. 4A is a diagram illustrating an embodiment of a satellite deployer (dispenser) door having a one way clutch bearing to prevent dispenser door bounce back. In the example shown, the door 302 is in vertical or closed position relative to the side and top walls of the dispenser body 402. A black mark at the 12 o'clock (top) position on the hinge pin 304 shows that the hinge and door are in the closed position. A stop 404 is shown at bottom, which in various embodiments may be included in a foot or similar structure attached to the dispenser body 402, such as feet 314, 320 of FIG. 3.

Figure 4B:
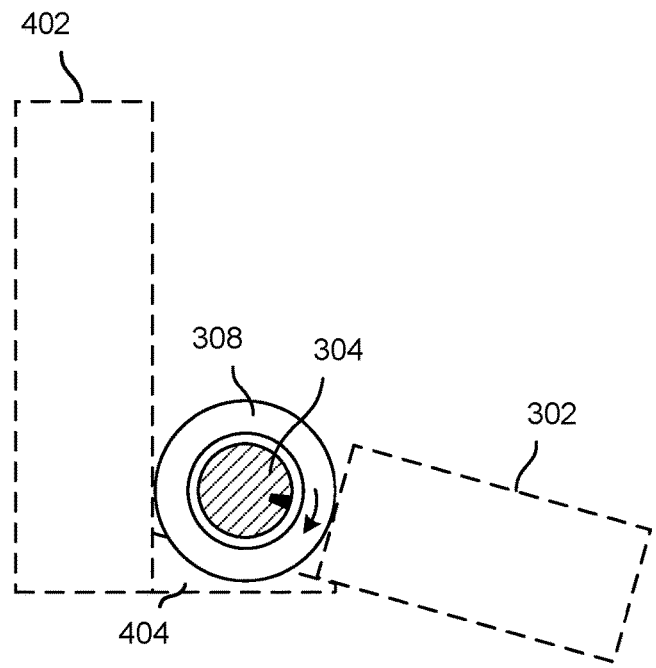
FIG. 4B shows the door 302 of the assembly shown in FIG. 4A once the door 302 has opened.

FIG. 4B shows the door 302 of the assembly shown in FIG. 4A once the door 302 has opened. In the example shown, the door 302 has opened to a point at which it has engaged the stop 404. The hinge pin 304 and the inner race of one way clutch bearing 308 have rotated to the position as shown. The structures of one way clutch bearing 308 that prevent rotation back towards the closed position, i.e., counter-clockwise as shown, prevent the door 302 from returning wholly or partly to the closed position, while the stop 404 prevents the door 302 from opening further.

In various embodiments, the combination of a one way clutch bearing such as bearing 308 and a physical stop such as stop 404 ensures the door 302 opens to the desired extent and remains fully opened at that extent. This ensure the dispenser payload is ejected and deploys without interference from the door 302 while also ensuring the opened door 302 does not interfere with the ejection and deployment of payloads from adjacent dispensers, if any.

While in certain example embodiments illustrated and described herein a one way clutch bearing is provided to ensure the dispenser door does not bounce back, potentially damaging the satellite and/or interfering with proper deployment, in various embodiments other equivalent structures are used to prevent the dispenser door from bouncing or being pushed back, including by way of example and without limitation one or more of a ratchet, such as pawl and ratchet wheel; a Sprague clutch or other one way clutch; etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A satellite dispenser door assembly, comprising:
   a dispenser door having a hinge pin; and
   a one way clutch bearing within which the hinge pin is free to rotate in a first rotational direction associated with a transition from a closed position of the dispenser door to an open position of the dispenser door;
   wherein:
      the dispenser door includes a structure configured to be engaged by a door release mechanism or a satellite dispenser on which the satellite dispenser door assembly is configured to be installed;
      the door release mechanism maintains the dispenser door in the closed position with respect to a dispenser body before deployment of a payload the dispenser body is configured to hold; and
      in response to the dispenser door being engaged by the door release mechanism, the hinge pin of the dispenser door rotates to the open position.

2. The satellite dispenser door assembly of claim 1, further comprising a clutch nut configured to hold a non-rotating portion of the one way clutch bearing in place relative to a stationary structure comprising a dispenser with which the dispenser door is associated.

3. The satellite dispenser door assembly of claim 1, wherein:
   the hinge pin comprises a first hinge pin positioned at one end of a hinged end of the dispenser door; and
   the dispenser door further includes a second hinge pin at an opposite end of the hinged end of the dispenser door.

4. The satellite dispenser door assembly of claim 3, wherein the one way clutch bearing comprises a first one way clutch bearing and further comprising a second one way clutch bearing within which the second hinge pin is free to rotate in a second rotational direction associated with the transition from the closed position of the dispenser door to the open position of the dispenser door.

5. The satellite dispenser door assembly of claim 1, further comprising a stop positioned to prevent the dispenser door from opening to greater than a designed extent relative to the closed position.

6. The satellite dispenser door assembly of claim 5, wherein the door assembly further comprises a foot configured to be mounted fixedly to a dispenser body of a dispenser with which the dispenser door assembly is associated and wherein the foot includes the stop.

7. The satellite dispenser door assembly of claim 1, wherein the door assembly further includes the door release mechanism.

8. The satellite dispenser door assembly of claim 1, wherein the door release mechanism includes a spring loaded pusher configured to push the dispenser door from the closed position towards the open position of the dispenser door.

9. The satellite dispenser door assembly of claim 1, wherein a control module is configured to cause a driving voltage or a driving current to be provided to the door release mechanism in response to a determination that the payload is to be deployed.

10. The satellite dispenser door assembly of claim 9, wherein in response to receipt of the driving voltage or the driving current, the door release mechanism engages the dispenser door in response to a determination that the payload is to be deployed.

11. The satellite dispenser door assembly of claim 1, further configured to allow the dispenser door to open at least 110 degrees from the closed position in relation to the dispenser body, and to ensure that the dispenser door does not wholly return to the closed position in relation to the dispenser body without manual intervention.

12. A satellite dispenser, comprising:
   a dispenser body defining a cavity;
   a satellite door assembly, comprising:
      a dispenser door having a hinge pin; and
      a one way clutch bearing within which the hinge pin is free to rotate in a first rotational direction associated with a transition from a closed position of the dispenser door to an open position of the dispenser door; and
   a door release mechanism that maintains the dispenser door in the closed position with respect to a dispenser body before deployment of a payload the dispenser body is configured to hold, and that engages the dispenser door in response to receipt of a driving voltage or driving current from a control module, wherein in response to the dispenser door being engaged, the hinge pin of the dispenser door rotates to the open position,
   wherein the door release mechanism is responsive to a control module configured to cause the driving voltage or driving current to be provided to the door release mechanism in response to a determination that the payload is to be deployed.

13. The satellite dispenser of claim 12, wherein the satellite dispenser is positioned adjacent to one or more other satellite dispensers, a distance between the satellite dispenser and the one or more other satellite dispensers being sufficient that when the dispenser door is opened to the designed extent relative to the closed position the dispenser door does not interfere with the ejection or deployment of one or more payloads from the one or more other dispensers.

14. The satellite dispenser of claim 12, wherein the satellite door assembly is configured to allow the dispenser door to open at least 110 degrees from the closed position, and to ensure that the dispenser door does not wholly return to the closed position without manual intervention.

* * * * *